United States Patent [19]
Savage

[11] 3,918,078
[45] Nov. 4, 1975

[54] CAMERA MAT BOX
[75] Inventor: David K. Savage, Stratford, N.J.
[73] Assignee: The Raymond Lee Organization, Inc., New York, N.Y. ; a part interest
[22] Filed: Apr. 8, 1974
[21] Appl. No.: 458,660

[52] U.S. Cl. ............................................... 354/296
[51] Int. Cl.² ...................................... G03B 17/00
[58] Field of Search ........ 354/296; 352/55; 355/113

[56] References Cited
UNITED STATES PATENTS

| | | | |
|---|---|---|---|
| 606,594 | 6/1898 | Stender | 354/296 |
| 1,294,249 | 2/1919 | Eckels | 352/55 |
| 1,991,814 | 2/1935 | Mitchell | 354/296 |
| 3,694,078 | 9/1972 | Bookless | 355/113 |

Primary Examiner—John M. Horan
Attorney, Agent, or Firm—Daniel Jay Tick

[57] ABSTRACT

A camera mat box comprises a box of substantially rectangular parallelepiped configuration having a first pair of parallel sides, a second pair of parallel sides perpendicular to the first pair of sides, a bottom and an open top. A lid is hingedly affixed to the top edge of one of the sides. An aperture is formed through one of the sides of the first pair of sides. Slots are provided in the box along both of the second pair of sides for supporting a mat in a desired one of a plurality of positions parallel to the first pair of sides at desired spaces from the aperture.

2 Claims, 4 Drawing Figures

CAMERA MAT BOX

DESCRIPTION OF THE INVENTION

The present invention relates to a camera mat box.

Objects of the invention are to provide a camera mat box of simple structure, which is inexpensive in manufacture, is easy, simple and convenient to use, and with which development and takes only seconds, instead of hours required in a darkroom working with negatives.

In order that the invention may be readily carried into effect, it will now be described with reference to the accompanying drawings, wherein.

In the FIGS., the same components are identified by the same reference numerals.

Figure 1:
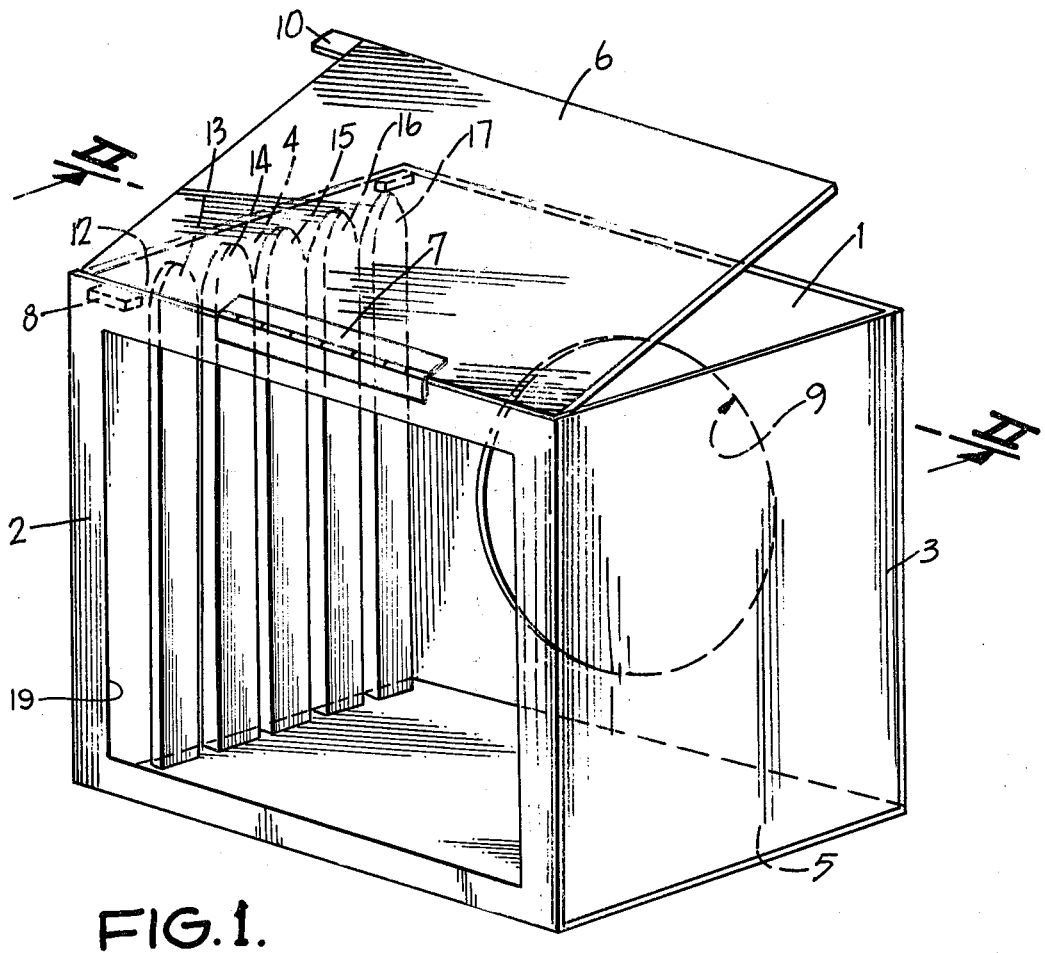
FIG. 1 is a schematic diagram of an embodiment of the camera mat box of the invention.

The camera mat box of the invention comprises a box of substantially rectangular parallelepiped configuration having a first pair of parallel sides 1 and 2, a second pair of parallel sides 3 and 4 perpendicular to the first pair of sides, a bottom 5 and an open top. A lid 6 is hingedly affixed to the top edge of the side 2 via a hinge or hinges 7 (FIG. 1).

A magnetic latch 8 is provided in the box for keeping the lid 6 closed, especially when the camera is tilted. This is necessary, since, if the camera is to function properly, the lid 6 must be kept closed and the only light admitted must be through an aperture 9 formed through the side 1 of the box (FIGS. 1 and 2). A projecting handle member 10 (FIG. 1) is provided on the lid 6 to facilitate opening of the lid.

Figure 4:
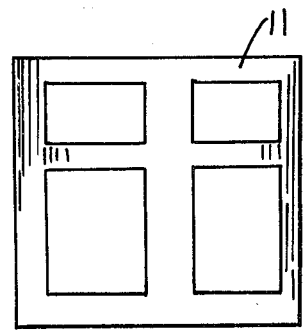
FIG. 4 is a view of a mat utilized with the camera mat box of the invention.

A plurality of slots are provided in the box along both of the sides 3 and 4 for supporting a mat such as, for example the mat 11 of FIG. 4, in a desired one of a plurality of positions parallel to the first pair of sides 1 and 2 at desired spaces from the aperture 9. The slots are provided by a first plurality of spaced members 12, 13, 14, 15, 16 and 17 affixed to the side 4 and a second plurality of identical members identically spaced and affixed to the side 3, but not shown in the FIGS., except for a section of one of the members 18 thereof (FIG. 2). The slot forming members are, of course, affixed to the inside of the box. The mat, such as 11, supported by the slot arrangement is preferably of hard cardboard.

Figure 2:
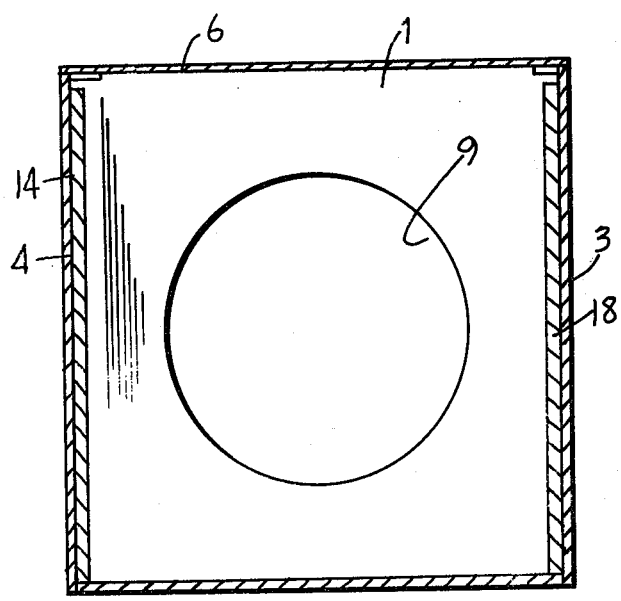
FIG. 2 is a sectional view, taken along the lines II–II, of FIG. 1.
Figure 3:
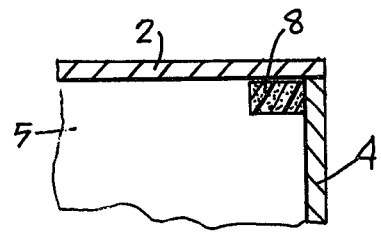
FIG. 3 is a sectional view, on an enlarged scale, of part of the camera mat box of the invention.

Although the slots and slot forming members on both sides 3 and 4 are identical, they are not shown for the side 3 in FIG. 1 in order to maintain the clarity of illustration.

A square opening 19 (FIGS. 1 and 2) is cut through the side 2. The opening 19 has a diagonal greater than the diameter of the aperture 9.

The mat box of the invention is used by placing a desired mat in a selected slot. The lid is then closed, so that light passes only through the square opening 19. The box is placed on a camera with the camera lens in the round aperture 9. The mat box of the invention produces a vignette by fading out the edges of the film. It also blocks out desired areas of a film. This is utilized for double or more exposures. It eliminates the need for vignetting, double exposures and trick shots being produced in the darkroom.

While the invention has been described by means of a specific example and in a specific embodiment, I do not wish to be limited thereto, for obvious modifications will occur to those skilled in the art without departing from the spirit and scope of the invention.

I claim:

1. A camera mat box, comprising a box of substantially rectangular parallelepiped configuration having a first pair of parallel sides, a second pair of parallel sides perpendicular to the first pair of sides, a bottom and an open top;

a lid hingedly affixed to the top edge of one of the sides;

magnetic latch means in the box for keeping the lid closed;

an aperture formed through one of the sides of the first pair of sides;

a square opening having a diagonal greater than the diameter of the aperture formed through the other of the first pair of sides; and slot means in the box along both of the second pair of sides for supporting a plurality of mats in desired ones of a plurality of positions parallel to the first pair of sides at desired spaces from the aperture.

2. A camer mat box as claimed in claim 1, further comprising a projecting handle member on the lid.

* * * * *